United States Patent [19]

Ueno

[11] Patent Number: 5,184,006

[45] Date of Patent: Feb. 2, 1993

[54] PHOTOELECTRIC CONVERSION APPARATUS HAVING CLOCK SIGNALS OF DIFFERENT FREQUENCIES

[75] Inventor: Isamu Ueno, Atsugi, Japan

[73] Assignee: Canon Kabushiki Kaisha, Tokyo, Japan

[21] Appl. No.: 688,276

[22] Filed: Apr. 22, 1991

[30] Foreign Application Priority Data

Apr. 23, 1990 [JP] Japan .................................. 2-105181
Apr. 23, 1990 [JP] Japan .................................. 2-105182

[51] Int. Cl.$^5$ .......................................... H01J 40/14
[52] U.S. Cl. .............................. 250/208.1; 358/213.11
[58] Field of Search .......................... 250/208.1, 208.4; 358/213.11, 213.15, 213.17, 213.18, 213.24

[56] References Cited

U.S. PATENT DOCUMENTS

| | | | |
|---|---|---|---|
| 4,578,707 | 3/1986 | Ozawa et al. | 358/213.15 |
| 4,954,703 | 9/1990 | Ohzu | 250/208.1 |
| 4,959,723 | 9/1990 | Hashimoto | 358/213.11 |
| 5,027,217 | 6/1991 | Oshio et al. | 358/213 |

FOREIGN PATENT DOCUMENTS

| | | |
|---|---|---|
| 0093077 | 11/1983 | European Pat. Off. . |
| 0253678 | 1/1988 | European Pat. Off. . |
| 63-200679 | 8/1988 | Japan . |
| 1-86677 | 3/1989 | Japan . |
| 1-231485 | 9/1989 | Japan . |
| 2160061 | 12/1985 | United Kingdom . |

Primary Examiner—David C. Nelms
Assistant Examiner—Que T. Le
Attorney, Agent, or Firm—Fitzpatrick, Cella, Harper & Scinto

[57] ABSTRACT

Photoelectric conversion apparatus including a photoelectric conversion sensor unit having a plurality of photoelectric conversion sensors, a driving signal generating circuit, which outputs a control signal for a phtoelectric converting operation of the photoelectric conversion sensor, and a scanning circuit for outputting a control signal to output a photoelectrically converted signal from the photoelectric conversion sensor unit, where a clock signal input into the driving signal generating circuit and a clock signal input into the scanning circuit are independently provided.

10 Claims, 9 Drawing Sheets

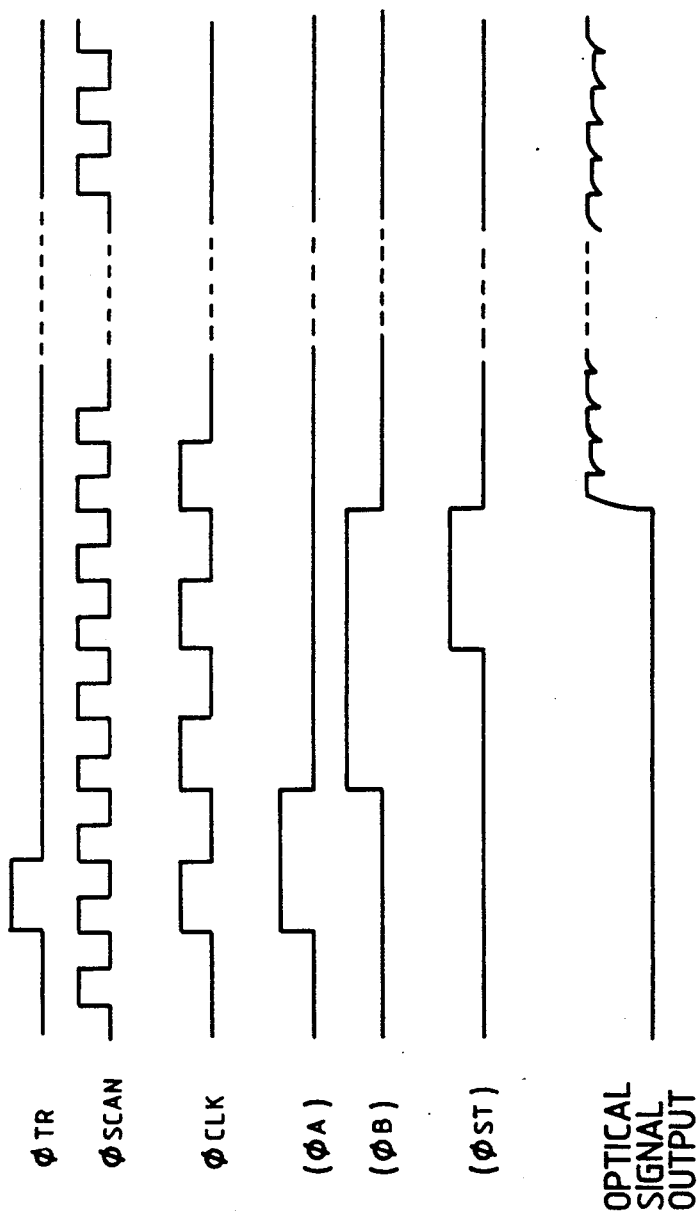

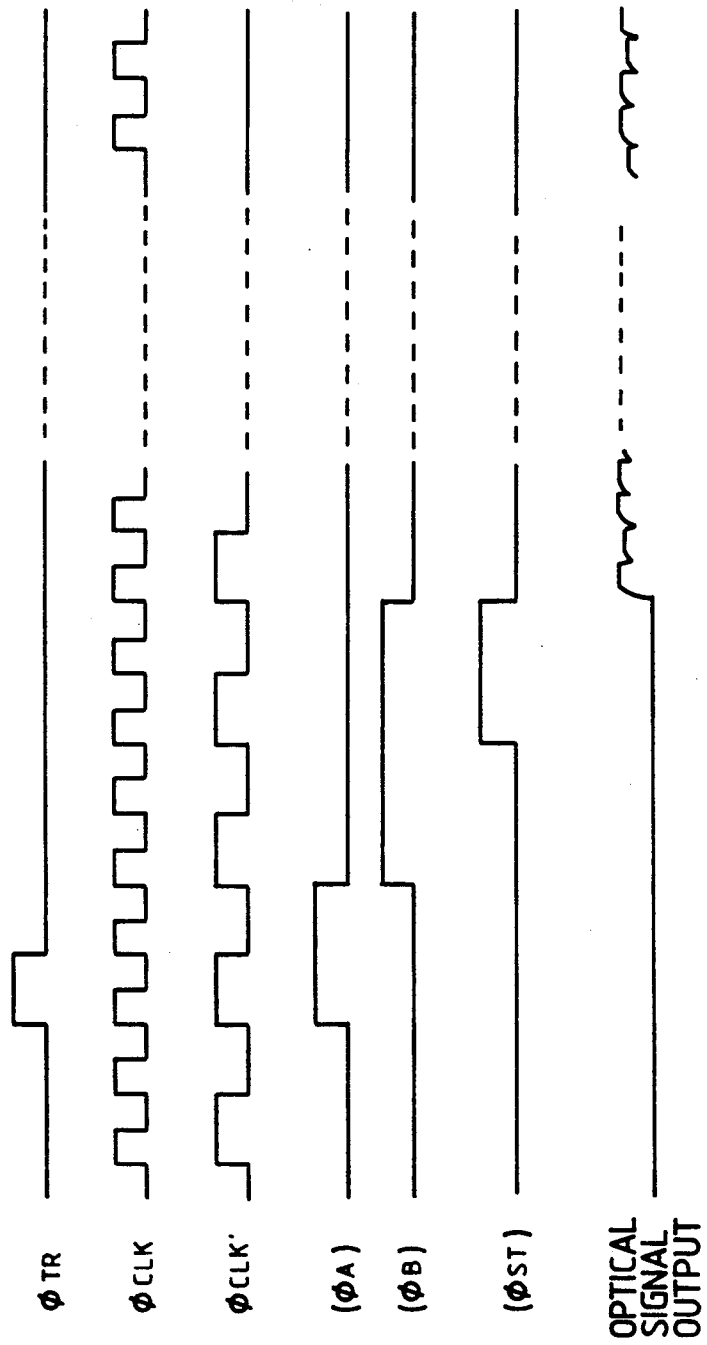

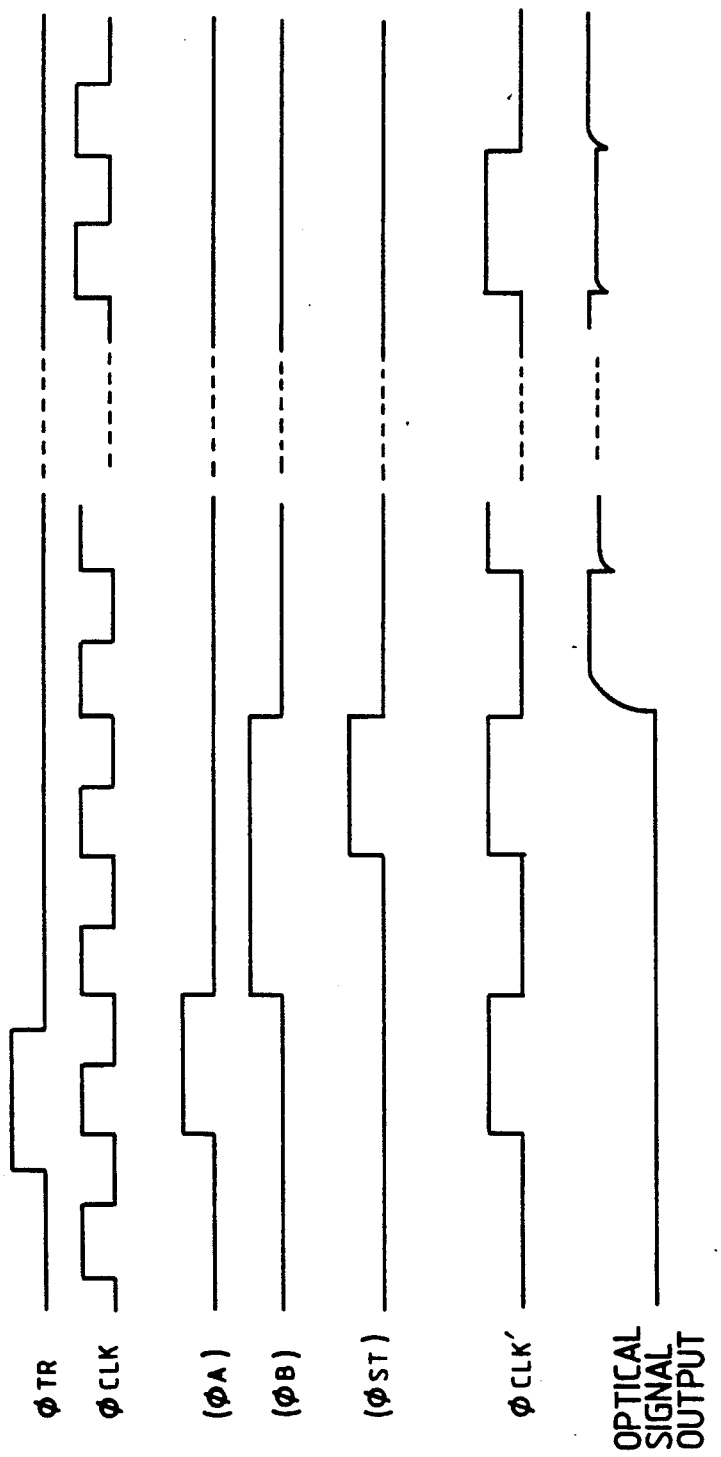

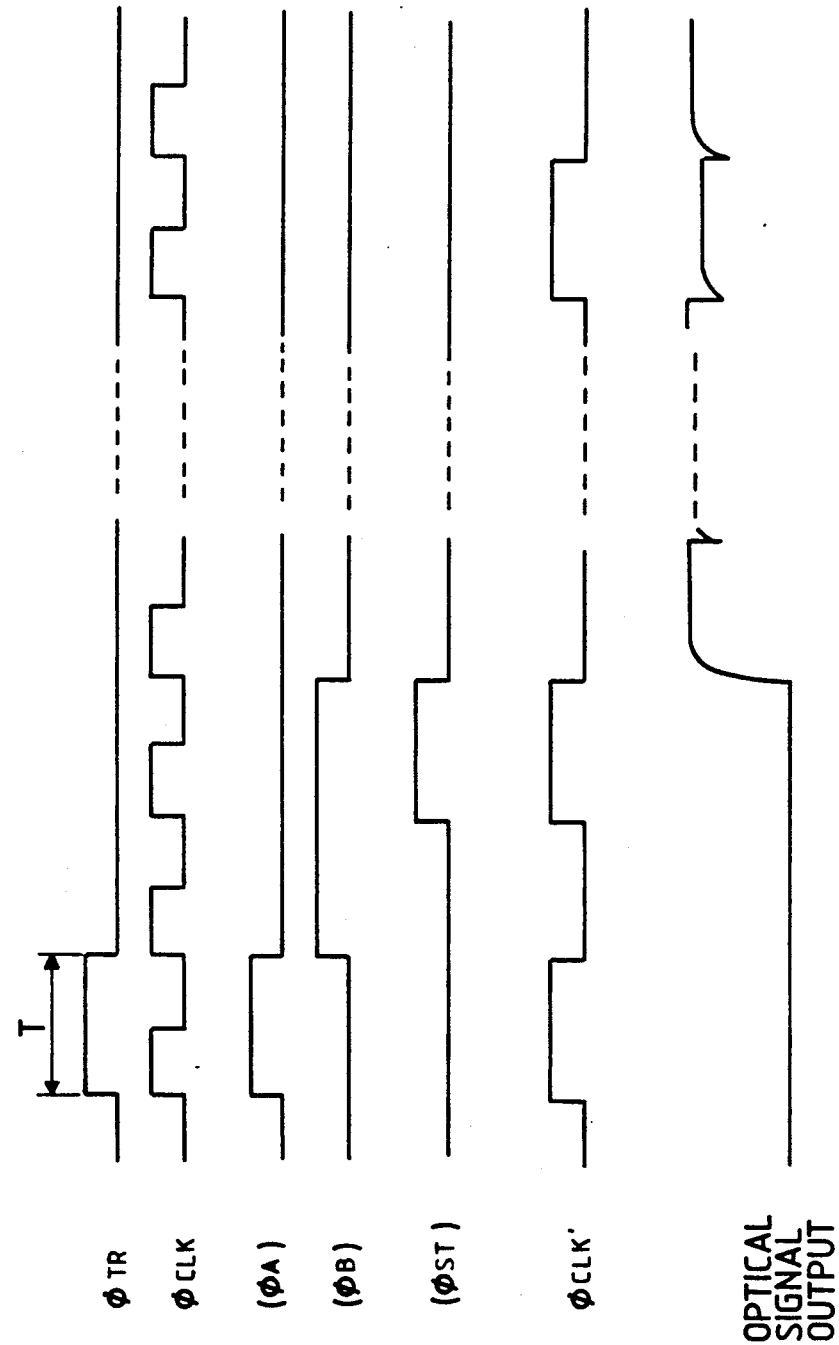

PHOTOELECTRIC CONVERSION APPARATUS HAVING CLOCK SIGNALS OF DIFFERENT FREQUENCIES

BACKGROUND OF THE INVENTION

1. Field of the Invention

The present invention is related to a photoelectric conversion apparatus, particularly an apparatus comprising a photoelectric conversion sensor unit having a plurality of photoelectric conversion sensors, driving signal generating means for outputting a control signal for a photoelectric converting operation of the photoelectric conversion sensor unit and scanning means for outputting a control signal to output a photoelectrically converted signal from said photoelectric conversion sensor unit.

2. Related Background Art

Among the photoelectric conversion apparatus, there are such apparatus requiring a pixel resetting operation because an electric charge remains in each pixel.

FIG. 1 is an equivalent circuit diagram to indicate one sensor pixel of a photoelectric conversion apparatus and FIG. 2 is the schematic block diagram of the photoelectric conversion apparatus.

As shown in FIG. 1, one sensor pixel is composed of a bipolar photoelectric conversion sensor Tr, storage condenser Cr to store the signal from the photoelectric conversion sensor Tr, MOS transistors M1 and M2, which reset the base area and emitter area of photoelectric conversion sensor Tr, MOS transistor M3, which transmits the electric charge to storage condenser Cr and resets it, and MOS transistor M4 for output which outputs, the electric charge stored in the storage condenser Cr. The sign $\phi s$ represents the scanning signal of MOS transistor M4 for output, $\phi BR$, $\phi VRS$ and $\phi T$ are signals for driving and resetting MOS transistors M1, M2 and M3.

In FIG. 2, said sensor pixels are arranged on the sensor pixel array 3 and signals $\phi BR$, $\phi VRS$ and $\phi T$ for driving and resetting are generated by the reset signals $\phi A$ and $\phi B$ coming from a driving signal generating circuit 1. Scanning signal $\phi S$ is generated by the scanning circuit 2. Driving signal generating circuit 1 is engaged by the trigger signal $\phi TR$ and basic action clock signal $\phi CLK$. Scanning circuit 2 is engaged by the basic action clock signal $\phi CLK$ and start signal $\phi ST$. Signals coming from sensor pixel array 3 are output through output circuit 4.

However with the aforesaid photoelectric conversion apparatus, there have been such problems that, for example, when the frequency of basic operation clock signal $\phi CLK$ is raised in order to increase the signal output frequency, the signals $\phi BR$, $\phi VRS$ and $\phi T$ for driving and resetting are uniformly shortened and the reset time becomes shorter than the preset reset time and it gives serious influence on the photoelectric characteristics of the system.

SUMMARY OF THE INVENTION

The object of the present invention is to give a solution to the aforesaid problems, and for such a purpose the present invention provides a photoelectric conversion apparatus comprising photoelectric conversion sensor unit having a plurality of photoelectric conversion sensors, driving signal generating means for outputting a control signal for photoelectric conversion operation of the photoelectric conversion sensor unit and scanning means for outputting a control signal to output signals of a photoelectrically converted signal from the photoelectric conversion sensor unit, wherein a clock signal input to said scanning means and a clock signal input to the driving signal generating means are independently provided.

Another embodiment of the present invention is the photoelectric conversion apparatus comprising a photoelectric conversion sensor unit having a plurality of photoelectric conversion sensors, driving signal generating means for outputting a control signal for a photoelectric conversion operation of said photoelectric conversion sensor unit and scanning means for outputting a control signal to output a photoelectrically converted signal from the photoelectric conversion sensor unit, wherein there is provided means for receiving either one of a clock signal input into the driving signal generating means and a clock signal input into the scanning means and a signal providing the correlation between the received clock signal and the other clock signal and for generating the other clock signal.

The photoelectric conversion apparatus of the present invention enables the control of a photoelectric conversion operation such as storage or resetting action of the photoelectric conversion sensor unit and the output operation to output the photoelectrically converted signal from the photoelectric conversion sensor unit by a frequency which can be arbitrarily set, since a clock signal input to said scanning means and a clock signal input to the driving signal generating means are independently provided.

Furthermore, the photoelectric conversion apparatus of the present embodiment enables the control of a photoelectric conversion operation such as the storage operation and resetting operation of a photoelectric conversion sensor unit and the output operation to output the photoelectrically converted signal from the photoelectric conversion sensor unit by the frequency which can be arbitrarily set and also enables to generate, upon receipt of either the clock signal input into the driving signal generating means or the clock signal input into the scanning means, the other clock signal, since there is provided means for receiving either one of a clock signal input into the driving signal generating means and a clock signal input into the scanning means and a signal providing the correlation between the received clock signal and the other clock signal and for generating the other clock signal.

Still other embodiment of the present invention is the photoelectric conversion apparatus comprising a photoelectric conversion sensor unit having a plurality of photoelectric conversion sensors, driving signal generating means for outputting a control signal for a photoelectric conversion operation of the photoelectric conversion sensor unit and scanning means for outputting a control signal to output a photoelectrically converted signal from the photoelectric conversion sensor unit, wherein a frequency of a clock signal input into the scanning means is changed by controlling a signal width of a trigger signal input into the driving signal generating means.

Photoelectric conversion apparatus of the present embodiment enables the individual control of a photoelectric converting operation of photoelectric conversion sensor unit, such as the storage operation, the resetting operation etc. and the output operation to output a photoelectrically converted signal from the photoelectric conversion sensor unit by a frequency which can be arbitrarily set, by changing the frequency of the clock signal input into the scanning means by controlling the signal width of a trigger signal input into the driving signal generating means, since a frequency of the clock signal input into the scanning means is changed by controlling the signal width of the trigger signal input into the driving signal generating means.

Other objects and characteristics of the present invention shall be made evident by the drawings and specifications given below.

BRIEF DESCRIPTION OF THE DRAWINGS

FIG. 5 is the schematic block diagram of the Embodiment 2 of the photoelectric conversion apparatus of the present invention and FIG. 6 is the timing chart to explain the performance of the present photoelectric conversion apparatus;

FIG. 7 is the schematic block diagram of the Embodiment 3 of the photoelectric conversion apparatus of the present invention and FIG. 8 is the timing chart to explain the performance of such photoelectric conversion apparatus;

FIG. 9 is the schematic block diagram of Embodiment 4 of the photoelectric conversion apparatus of the present invention and FIG. 10 is the timing chart to explain the performance of such photoelectric conversion apparatus;

FIG. 12 is the timing chart to explain the performance of such photoelectric conversion apparatus.

DETAILED DESCRIPTION OF THE PREFERRED EMBODIMENT

Figure 1:
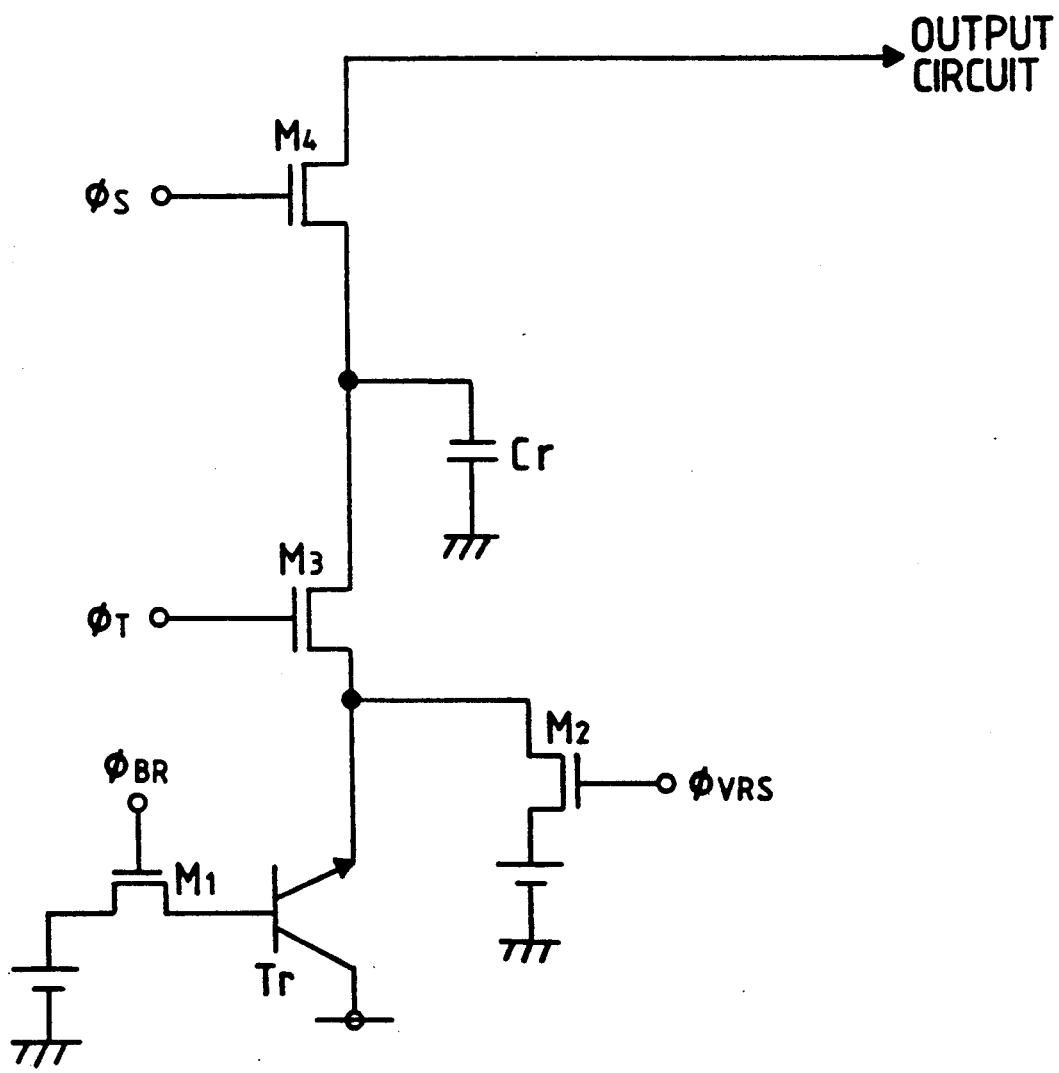
FIG. 1 is the equivalent circuit diagram to show a sensor pixel of a photoelectric conversion device and FIG. 2 is the schematic block diagram of the photoelectric conversion apparatus.

Hereunder are described the details of the Embodiment of the present invention in reference to the drawing.

Figure 3:
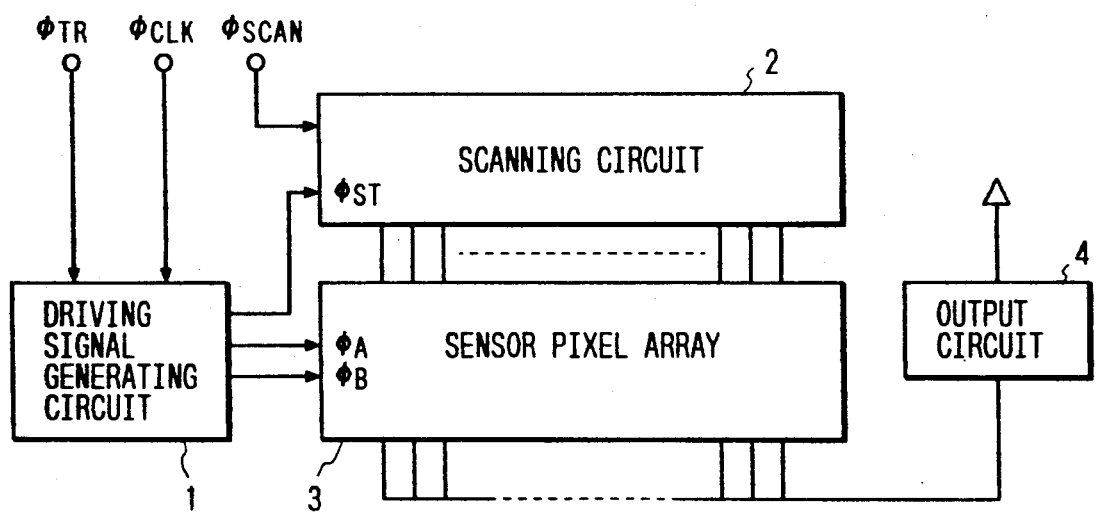
FIG. 3 is the schematic block diagram to show the composition of Embodiment 1 of the photoelectric conversion apparatus of the present invention and FIG. 4 is the timing chart to explain the performance of the photoelectric conversion apparatus.
Figure 4:
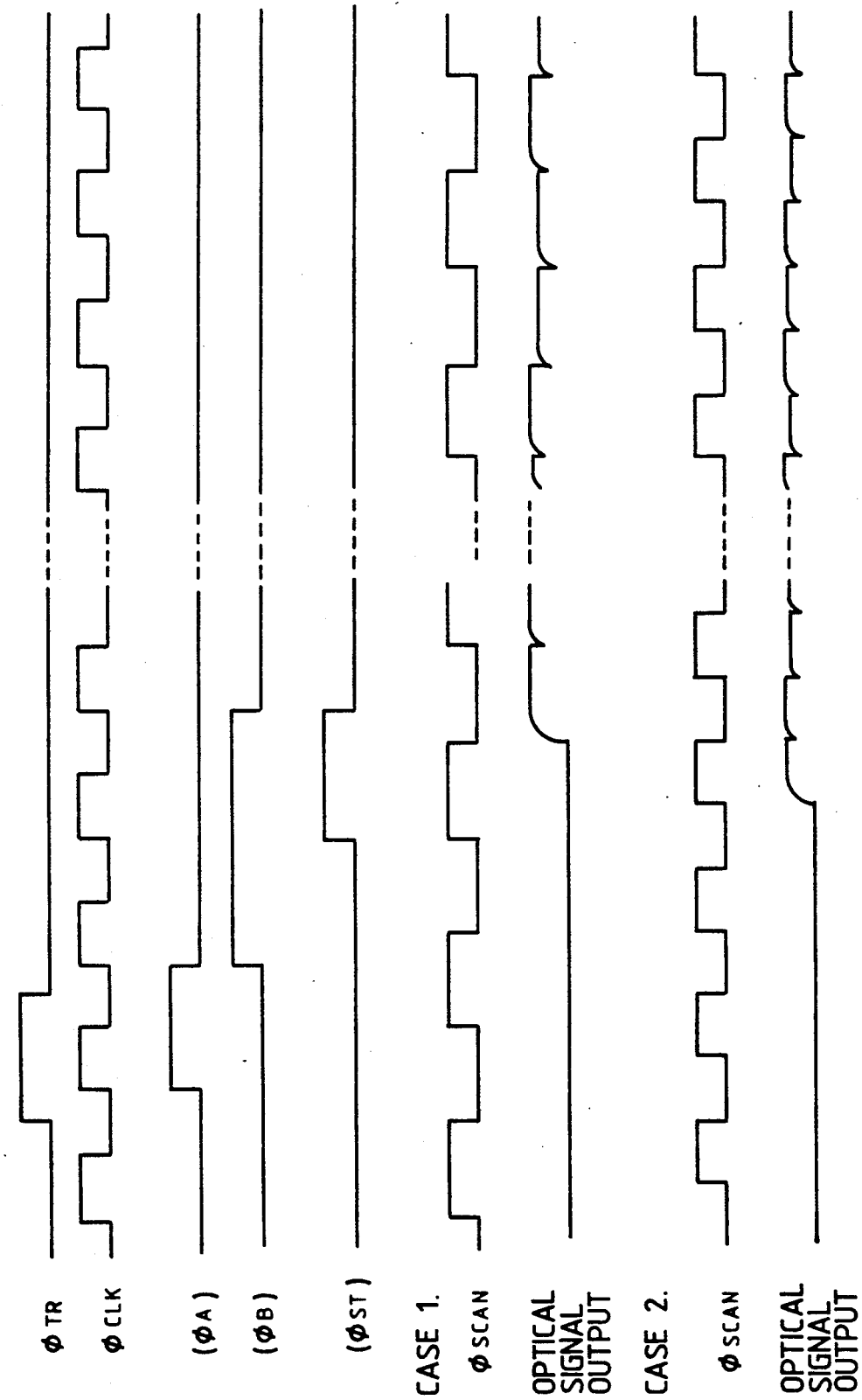

FIG. 3 is the schematic block diagram of the photoelectric conversion apparatus of the present invention and FIG. 4 is the timing chart to explain the performance of such photoelectric conversion apparatus.

Figure 2:
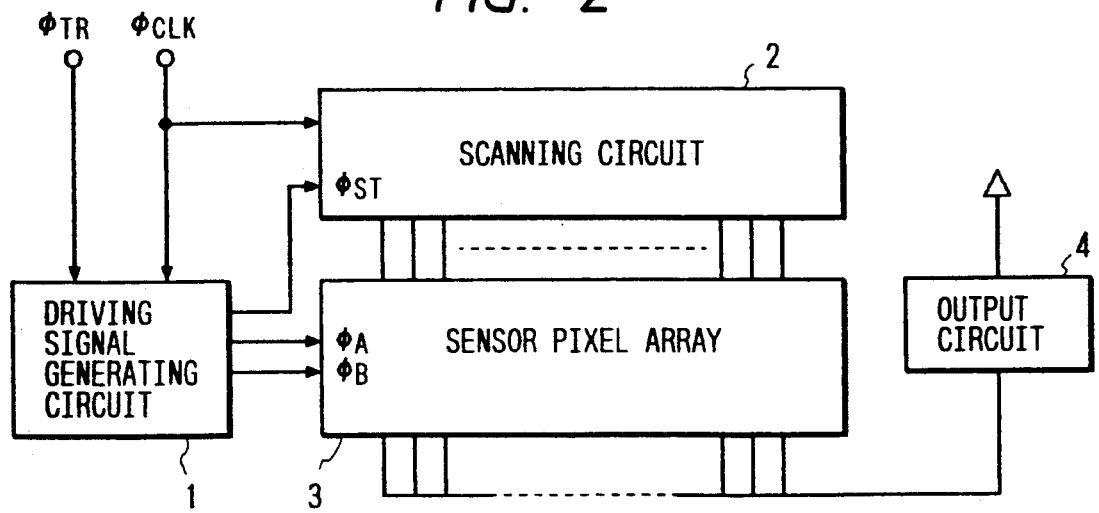

In the Embodiment described below, the same components to those indicated in FIG. 2 are given the same symbols and their explanations are omitted. The composition of the sensor pixel of the photoelectric conversion equipment of the present embodiment is identical to the sensor pixel explained in reference to FIG. 1.

As indicated in FIG. 3, in the case of the present Embodiment, in addition to the trigger signal $\phi TR$ and the basic operation clock signal $\phi CLK$ (here, the "clock signal to be input into the driving signal generating means 1 mentioned in the present Embodiment" means this basic operation clock signal $\phi CLK$. Same applies to the Embodiment 2 to be stated later), the clock signal $\phi SCAN$ for scanning (in the present Embodiment, "clock signal to be input into scanning means" means this clock signal $\phi SCAN$ for scanning. Same applies to the Embodiment 2 to be stated later) is provided.

When trigger signal $\phi TR$ and the basic operation clock signal $\phi CLK$ are input, the reset signal $\phi A$, $\phi B$ are generated at the driving signal generation circuit and the start signal $\phi ST$ of the scanning circuit 2 is generated.

Here, the driving and resetting signal $\phi BR$, $\phi VRS$ and $\phi T$ to be generated by reset signal $\phi A$ and $\phi B$, must be in an operation during preset time, and therefore trigger signal $\phi TR$ and the basic performance clock signal $\phi CLK$ are constant clock signals.

When scanning clock signal $\phi SCAN$ is input, scanning circuit 2 functions. Since scanning clock signal $\phi SCAN$ and the basic operation clock signal $\phi CLK$ are independently input, it is possible to change the frequency of the optical signal output synchronizing it with the scanning clock signal $\phi SCAN$ and making it irrelevant to the basic operation clock signal $\phi CLK$ as shown in FIG. 4 (in the Figure, Case 1 shows the case when the frequency of scanning clock signal $\phi SCAN$ is smaller than the that of the basic operation clock signal $\phi CLK$ and Case 2 is the case when the frequency of scanning clock signal $\phi SCAN$ is equal to that of the basic operation clock signal $\phi CLK$).

Figure 5:
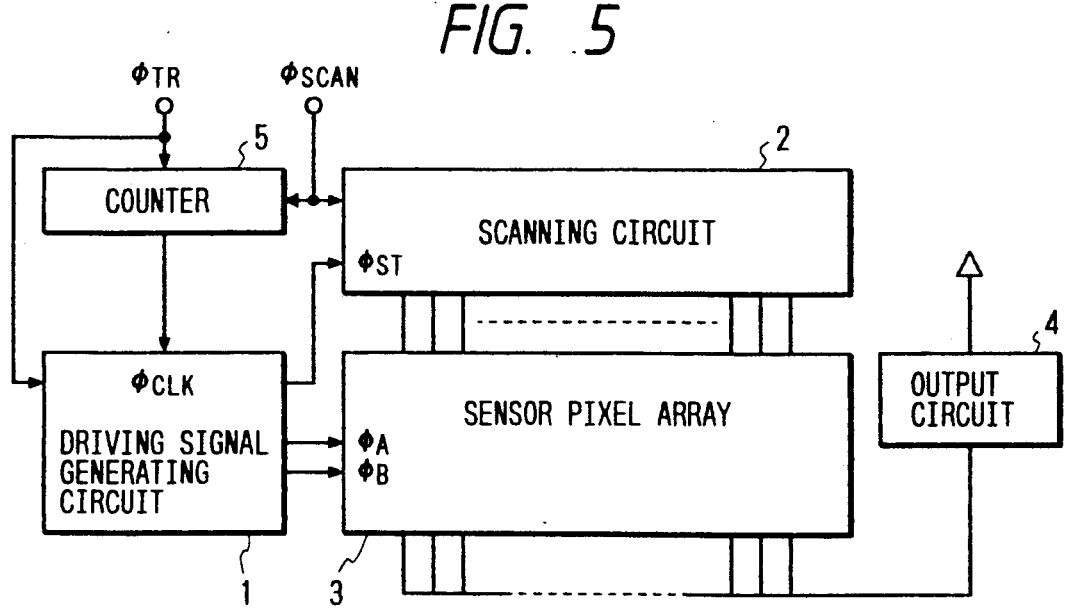

FIG. 5 is the schematic block diagram of Embodiment 2 of the photoelectric conversion equipment of the present invention and FIG. 6 is the timing chart to explain the performance of this photoelectric conversion apparatus.

The component members same as those of FIG. 2 are given the same symbols and their explanations are omitted. The composition of the sensor pixel of the photoelectric conversion apparatus of the present Embodiment is identical to that of the sensor pixel explained in FIG. 1.

In the Embodiment 1 stated above, three clock signals, namely, the trigger signal $\phi TR$, the basic operation clock signal $\phi CLK$ and the scanning clock signal $\phi SCAN$ have been input but in the present Embodiment, it is intended that the basic operation clock signal $\phi CLK$ be generated from trigger signal $\phi TR$ and the scanning clock signal $\phi SCAN$. In other words, the scanning clock signal $\phi SCAN$ is counted by counter 5 while the trigger signal $\phi TR$ is at "H" level (i.e., high level) and the basic operation clock signal $\phi CLK$ is generated therefrom.

Therefore, if the period when trigger signal $\phi TR$ is held at "H" level is made constant, even when the frequency of the scanning clock signal $\phi SCAN$ should change, always the same basic operation clock signal $\phi CLK$ is obtained as long as the scanning clock signals $\phi SCAN$ of the preset number are input into the counter 5 within the "H" level period of trigger signal $\phi TR$ and therefore also for reset signal $\phi A$, $\phi B$ and $\phi ST$, always the desired clock signal is obtained. As the result, the signal output having the desired photoelectric characteristics can be obtained at the desired frequency.

Figure 7:
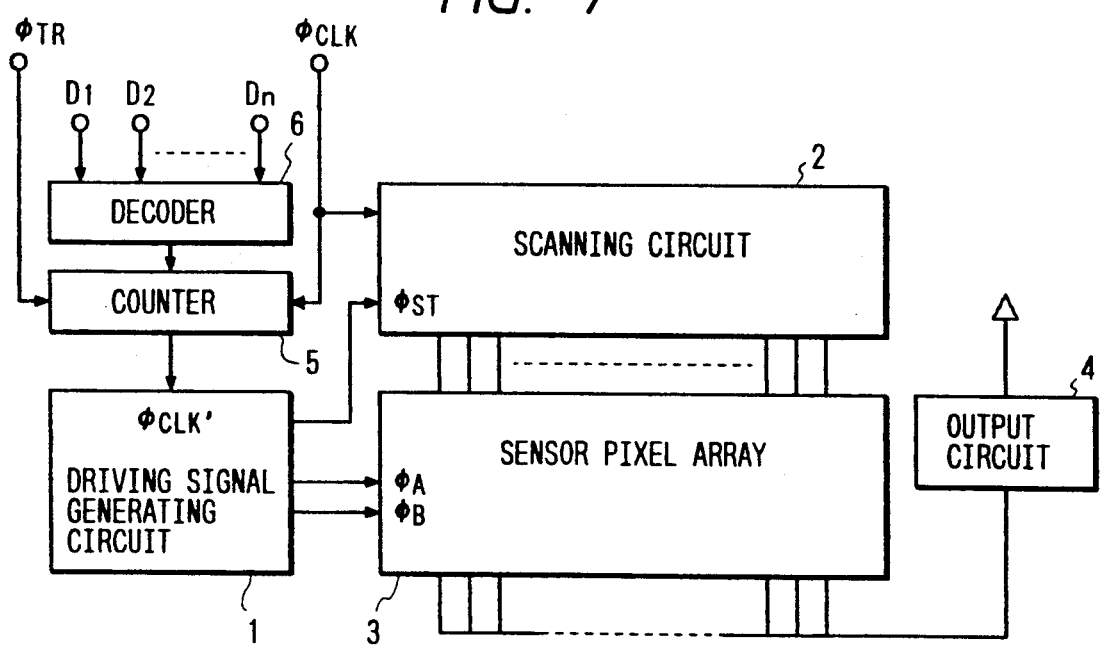

FIG. 7 is the schematic block diagram of the Embodiment 3 of the photoelectric conversion apparatus of the present invention and FIG. 8 is the timing chart to explain the performance of the present photoelectric conversion apparatus.

In the present Embodiment, in addition to the trigger signal $\phi TR$ and the basic operation clock signal $\phi CLK$, the digital input D1–Dn are input as shown in FIG. 7.

When the trigger signal $\phi TR$ and the basic operation clock signal $\phi CLK$ are input, digital input D1–Dn are decoded through decoder 6 and the signals are sent to counter 5. At counter 5, based on such signals, the clock signal φCLK to be used in the driving signal generation circuit 1 is generated. The timing chart of FIG. 8 assumes the case of D1=0, D2=1, D3=D4=...=Dn i.e., the case when information from the digital input is "2".

At the driving signal generation circuit 1, reset signals φA, φB and φST are generated based on the clock signal φCLK (in this Embodiment, "the clock signal to be input into the driving signal generation means" means this clock signal φCLK).

Figure 9:
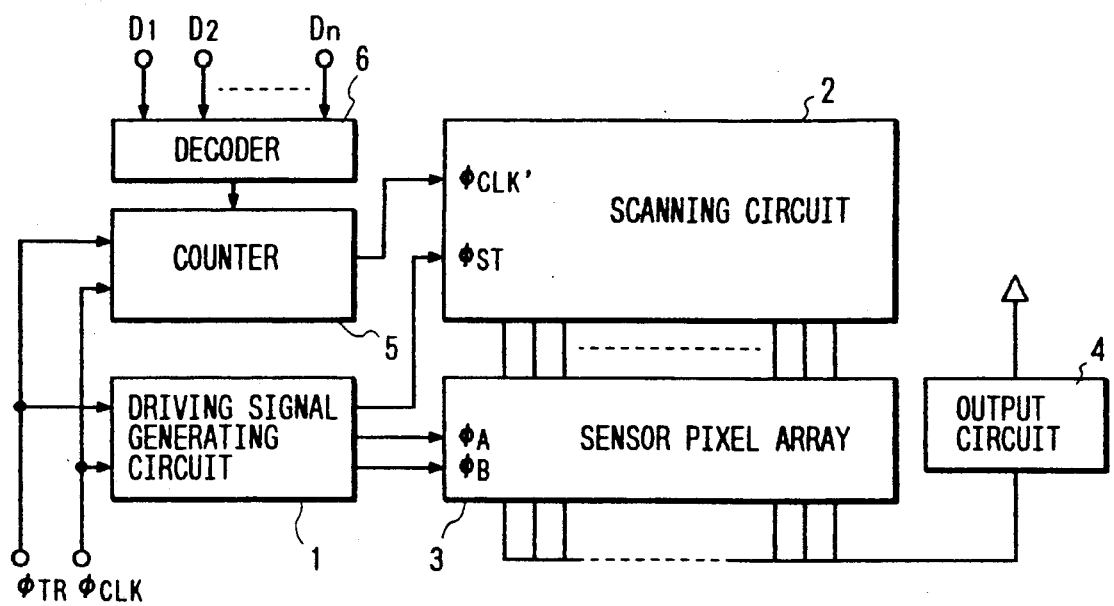

On the other hand, basic operation clock signal φCLK (in this Embodiment, "clock signal to be input into the scanning means" means this basic operation clock signal φCLK) is directly input into scanning circuit 2 and consequently the signal output frequency is determined by the frequency of basic operation clock signal φCLK. Here, even when the basic operation clock signal φCLK is made at high speed and signal output frequency is set at high level, it is possible to set the frequency of the clock signal φCLK at the preset level by changing the value of digital input D1–Dn and desired photoelectric characteristics are obtained from each sensor pixel. In FIG. 6, the basic operation clock signal φCLK is used for scanning circuit 2 and clock signal φCLK is used for driving signal generation circuit 1 but as shown in FIG. 9 and FIG. 10, the similar effect is obtained when the connection is reversed and the basic operation clock signal φCLK is used for the driving signal generation circuit 1 (that is, the basic operation clock signal φCLK is used as the "clock signal to be input into the driving signal generating means") and clock signal φCLK is used for the scanning circuit 2 (this is, the clock signal φCLK that is used as the "clock signal to be input into scanning means").

As described in detail as above, according to the photoelectric conversion apparatus of the present Embodiment, by independently providing the clock signal to be input into the driving signal generating means and the clock signal to be input into scanning means, the photoelectric converting action such as the storage operation and the resetting operation of the photoelectric conversion sensor unit and the output operation to output the signal having received the photoelectric conversion from the photoelectric conversion sensor unit can be controlled by the frequency which may be set arbitrary.

According to the photoelectric conversion apparatus of the present invention, by providing the means which, upon receipt of either the clock signal input into the driving signal generating means or the clock signal input into the scanning means and the input signal providing the correlation between the input signal and the other clock signal, generates the other clock signal, the photoelectric conversion operation of the photoelectric conversion sensor unit such as the storage operation and the resetting operation and the output operation to output the signal having received photoelectric conversion from the photoelectric conversion sensor unit can be controlled by the frequency which can be arbitrary set and also, based on either the clock signal input into the driving signal generating means or the clock signal input into the scanning means, the other clock signal having been input as above can be generated.

Hereunder is described in detail the Embodiment 5 of the present invention in reference to the drawings.

Figure 11:
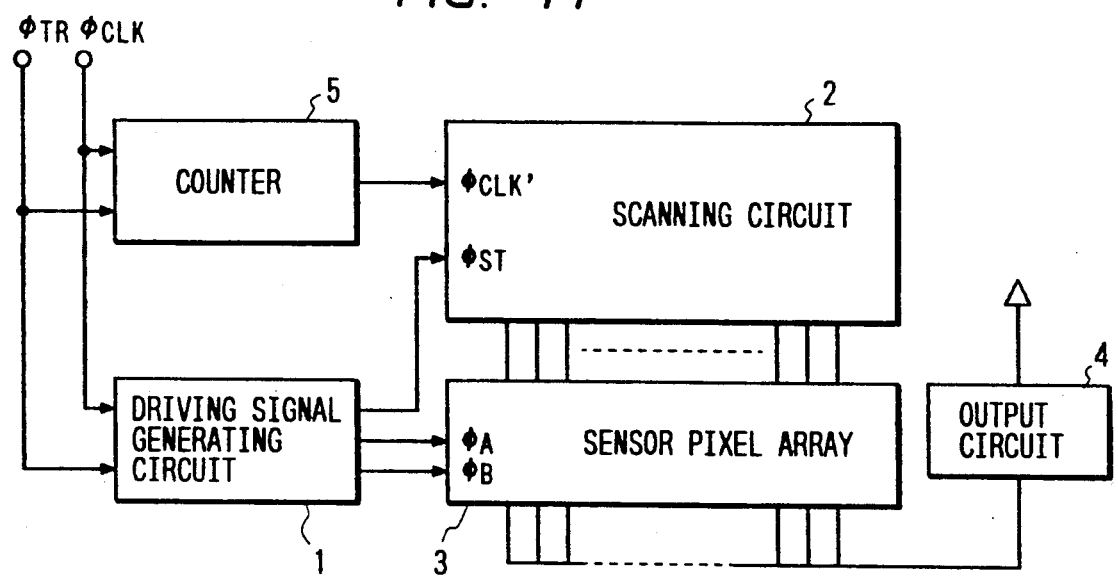
FIG. 11 is the schematic drawing of the Embodiment 5 of the photoelectric conversion apparatus of the present invention.

FIG. 11 is the schematic block diagrams of an Embodiment of the photoelectric conversion apparatus of the present invention and FIG. 12 is the timing chart to explain the performance of such photoelectric conversion apparatus.

As shown in FIG. 11, when trigger signal φTR and the basic operation clock signal φCLK are input, the clock number of the basic operation clock signal φCLK during the period when trigger signal φTR is at H level (in the case of the circuit of the present Embodiment, positive logic, wherein "1" is H level and "0" is L level (i.e., low level) is employed but it may be a negative logic) is counted by counter 5 and based on such data, the clock signal φCLK is generated. Basic operation clock signal φCLK is input into the driving signal generation circuit 1 and there the reset signal φA, φB and start signal φST of scanning circuit 2 are generated. Clock signal φCLK is input into the scanning circuit 2.

The frequency of the basic operation clock signal φCLK is set irrespective of the change of signal width T of the trigger signal φTR (width of the duration when trigger signal φTR is at H level) and as stated above, clock signal φCLK can be set arbitrarily by the control of signal width T of trigger signal φTR. As the result, the frequency of the scanning signal φSCAN to be generated based on the clock signal φCLK can be set independently from the frequency of the driving and resetting signals φBR, φVRS, φT which are generated based on the basic operation clock signal φCLK.

As explained in detail in the above, according to the photoelectric conversion device of the present Embodiment, the photoelectric conversion operation of the photoelectric conversion sensor unit, such as the storage operation and the resetting operation and the output operation to output the signal having received photoelectric conversion from the respective photoelectric conversion sensors of the photoelectric conversion sensor unit can be controlled independently by the frequency, which can be arbitrarily set.

What is claimed is:

1. Photoelectric conversion apparatus comprising:
    photoelectric conversion sensor unit having a plurality of photoelectric conversion sensors;
    driving signal generating means for outputting a control signal for a photoelectric converting operation of said photoelectric conversion sensor unit; and
    scanning means for outputting a control signal to output a photoelectrically converted signal from said photoelectric conversion sensor unit, wherein a first clock signal inputted into said driving signal generating means and a second clock signal inputted into said scanning means are independently provided.

2. Photoelectric conversion apparatus according to claim 1, wherein the second clock signal inputted into said scanning means comprises a signal with variable frequency.

3. Photoelectric conversion apparatus according to claim 1, wherein the first clock signal inputted into said driving signal generating means is generated by the second clock signal inputted into said scanning means and the trigger signal input into said driving signal generating means.

4. Photoelectric conversion apparatus comprising:
    a photoelectric conversion sensor unit having a plural number of photoelectric conversion sensors;

driving signal generating means for outputting a control signal for a photoelectric converting operation of said photoelectric conversion sensor unit; and scanning means for outputting a control signal to output a photoelectrically converted signal from said photoelectric conversion sensor unit;

wherein said apparatus further comprises means for generating one of a clock signal inputted into said driving signal generating means and a scanning clock signal inputted into said scanning means from the other clock signal and a signal providing a correlation between the clock signal and the scanning clock signal.

5. Photoelectric conversion apparatus according to claim 4, wherein the scanning clock signal inputted into said scanning means comprises a signal with an arbitrary frequency.

6. Photoelectric conversion apparatus comprising: photoelectric conversion sensor unit having plural of photoelectric conversion sensors; driving signal generating means for outputting a control signal for a photoelectric converting operation of photoelectric conversion sensor unit and scanning means for outputting a control signal to output a photoelectrically converted from said photoelectric conversion unit, wherein a frequency of a clock signal input into said scanning means is set arbitrarily by controlling a signal width of a trigger signal input into said driving signal generating means.

7. Photoelectric conversion apparatus comprising:
(a) photoelectric conversion unit having plural of photoelectric conversion elements which photoelectrically convert light from an object;
(b) first driving control means for controlling an operation of said photoelectric conversion unit; and
(c) second driving control means for causing said photoelectric conversion unit to output a photoelectrically converted signal;
wherein, said first and second driving control means are driven respectively by clock signals of different frequencies.

8. Photoelectric conversion apparatus according to claim 7, wherein said photoelectric conversion unit further has a memory means for memorizing the photoelectrically converted signal output from said photoelectric conversion elements.

9. Photoelectric conversion apparatus according to claim 8, wherein said memory means includes a capacitor.

10. Photoelectric conversion apparatus according to claim 7, further comprising; means for generating another clock signal based on a reference clock signal and applying said other clock signals to said first or second driving control means.

* * * * *

UNITED STATES PATENT AND TRADEMARK OFFICE
CERTIFICATE OF CORRECTION

PATENT NO. : 5,184,006
DATED : February 2, 1993
INVENTOR(S) : UENO

It is certified that error appears in the above-identified patent and that said Letters Patent is hereby corrected as shown below:

COLUMN 1

Line 33, "output" should read --outputs--.
Line 34, "outputs," should read --outputs--.
Line 50, "However" should read --However,--.

COLUMN 4

Line 22, "the" (first occurrence) should be deleted.

COLUMN 5

Line 48, "arbitrary." should read --arbitrarily.--.
Line 62, "arbitrary" should read --arbitrarily--.

COLUMN 6

Line 1, "diagrams" should read --diagram--.

Signed and Sealed this

Eleventh Day of January, 1994

Attest:

BRUCE LEHMAN

*Attesting Officer*     *Commissioner of Patents and Trademarks*